(12) United States Patent
Han et al.

(10) Patent No.: US 11,354,630 B1
(45) Date of Patent: Jun. 7, 2022

(54) ELECTRONIC APPARATUS FOR PROCESSING INFORMATION FOR POINT CONVERSION AND METHOD THEREOF

(71) Applicant: Coupang Corp., Seoul (KR)

(72) Inventors: Gang Soo Han, Seoul (KR); Ji Man Lee, Seoul (KR); Hyun Sik Park, Seoul (KR); Ho Hyun Lim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/225,692

(22) Filed: Apr. 8, 2021

(30) Foreign Application Priority Data

Mar. 16, 2021 (KR) .................. 10-2021-0034170

(51) Int. Cl.
*G06Q 20/10* (2012.01)
*G06Q 20/38* (2012.01)

(52) U.S. Cl.
CPC .......... *G06Q 20/10* (2013.01); *G06Q 20/381* (2013.01)

(58) Field of Classification Search
None
See application file for complete search history.

(56) References Cited

U.S. PATENT DOCUMENTS

| 2002/0026354 | A1* | 2/2002 | Shoji | G06Q 30/0217 705/14.19 |
| 2006/0167744 | A1* | 7/2006 | Yoo | G06Q 30/0209 705/14.19 |
| 2008/0120129 | A1* | 5/2008 | Seubert | G06Q 10/10 705/35 |
| 2009/0254971 | A1* | 10/2009 | Herz | G06Q 30/0603 726/1 |
| 2015/0294377 | A1* | 10/2015 | Chow | G06Q 30/0282 705/347 |
| 2018/0357658 | A1* | 12/2018 | Kikuchi | G06Q 20/06 |

FOREIGN PATENT DOCUMENTS

| JP | 2014119805 A | * | 6/2014 |
| JP | 2018-081663 A | | 5/2018 |
| KR | 10-2000-0037169 A | | 7/2000 |
| KR | 10-2001-0083521 A | | 9/2001 |
| KR | 10-2003-0079630 A | | 10/2003 |
| KR | 10-2006-0052647 A | | 5/2006 |
| KR | 10-0802556 B1 | | 2/2008 |
| KR | 10-2012-0087304 A | | 8/2012 |
| KR | 10-2015-0093269 A | | 8/2015 |
| KR | 10-2016-0121957 A | | 10/2016 |
| KR | 10-1847450 B1 | | 4/2018 |
| KR | 10-1906087 B1 | | 10/2018 |
| KR | 10-2019-0116840 A | | 10/2019 |

* cited by examiner

*Primary Examiner* — Bruce I Ebersman
*Assistant Examiner* — Matthew Cobb
(74) *Attorney, Agent, or Firm* — Knobbe, Martens, Olson & Bear, LLP

(57) ABSTRACT

Disclosed is a method of processing information in an electronic apparatus, the method including transmitting a point inquiry request including user information for identifying a user to servers of one or more affiliates, acquiring balance information of a first point corresponding to the user from a first affiliate among the one or more affiliates in response to the point inquiry request, providing the balance information of the first point to the user, and processing, when information including a conversion request for conversion between the first point and a second point related to a service of the electronic apparatus is acquired from the user, a transaction corresponding to the conversion request.

20 Claims, 10 Drawing Sheets

ELECTRONIC APPARATUS FOR PROCESSING INFORMATION FOR POINT CONVERSION AND METHOD THEREOF

BACKGROUND

Technical Field

The present disclosure relates to an electronic apparatus for processing information for point conversion and a method thereof. More particularly, the present disclosure relates to an electronic apparatus that processes a transaction corresponding to a conversion request for conversion between a first point corresponding to a first affiliate and a second point related to a service of the electronic apparatus when information including the conversion request is acquired from a user and a method thereof.

Description of the Related Art

With the development of electronic technology, electronic payment methods such as credit cards are actively used for the payment of items. A card company managing credit cards provides benefits for the use of the credit cards in order to encourage a user to use a credit card. The benefits granted may include card points obtained by quantifying mileage accrued by using the credit card.

In addition, various companies also operate mileage or point systems to encourage the use of their own services or the purchase of items they sell. For example, airline mileage may be accumulated when using airline services.

However, some users may not be able to actively use the points or mileage because they do not know the existence of the accumulated points or mileage, or do not know where to use them. In particular, in the case of the card point or mileage that expires after a certain period of time elapses, it is necessary to provide a method for the user to fully enjoy the benefits within the period.

Regarding this, related art documents such as KR20160121957A and KR100802556B1 may be referenced.

SUMMARY

Technical Goals

An aspect provides an electronic apparatus that processes a transaction corresponding to a conversion request for conversion between a first point corresponding to a first affiliate and a second point related to a service of the electronic apparatus when information including the conversion request is acquired from a user and a method thereof.

However, the goals to be achieved by example embodiments of the present disclosure are not limited to the objectives described above and other objects may be inferred from the following example embodiments.

Technical Solutions

According to an aspect, there is provided a method of processing information in an electronic apparatus, the method including transmitting a point inquiry request including user information for identifying a user to servers of one or more affiliates, acquiring balance information of a first point corresponding to the user from a first affiliate among the one or more affiliates in response to the point inquiry request, providing the balance information of the first point to the user, and processing, when information including a conversion request for conversion between the first point and a second point related to a service of the electronic apparatus is acquired from the user, a transaction corresponding to the conversion request.

The user information may include at least one of connecting information (CI) for identifying the user in the one or more affiliates and inquiry identification information generated in the electronic apparatus in response to the point inquiry request.

The inquiry identification information may be generated based on a time point corresponding to an acquisition of the inquiry identification information, a serial number corresponding to a server device acquiring the inquiry identification information, and a sequence number corresponding to an ordinal position at which the inquiry identification information is acquired among a plurality of pieces of inquiry identification information acquired in the electronic apparatus based on the time point.

The inquiry identification information may be information generated by converting fourth information into a base-32 number. The fourth information may include first information having a size of at most 32 bits and corresponding to the time point, second information having a size of 8 bits and corresponding to the serial number corresponding to the server device, and third information having a size of at most 8 bits and corresponding to the sequence number.

The processing of the transaction corresponding to the conversion request may include transmitting information corresponding to the conversion request to the first affiliate and changing balance information of the second point. The information corresponding to the conversion request may include at least one of CI and inquiry identification information generated in the electronic apparatus based on the transaction.

The changing of the balance information of the second point may include changing the balance information of the second point when approval information is received from the first affiliate in response to the conversion request.

The processing of the transaction corresponding to the conversion request may further include recording processing of the transaction by storing the inquiry identification information.

The method may further include acquiring information on an affiliate related to the user from the user. The one or more affiliates may be determined based on the information on the affiliate related to the user.

When advance approval information related to point conversion corresponding to the first affiliate is acquired from the user, the first point may be converted to the second point based on the advance approval information while an acquisition of information including the conversion request is omitted.

Advance approval information related to a point inquiry corresponding to the first affiliate may be acquired from the user. Transmission of the point inquiry request may be omitted. The balance information of the first point may be acquired based on the advance approval information.

The method may further include excluding a second affiliate from the one or more affiliates when information indicating that the user is not a member of the second affiliate is received from the second affiliate among the one or more affiliates in response to the point inquiry request.

The method may further include acquiring information including a conversion ratio between the first point and the second point. The transaction may be performed based on the information including the conversion ratio.

The method may further include providing, to the user, at least one of the balance information of the first point and balance information of the second point corresponding to the conversion request.

The method may further include acquiring a payment request for one or more items from the user. The point inquiry request may be transmitted based on the payment request.

The method may further include providing, to the user, an interface for paying the one or more items based on balance information of the second point corresponding to the conversion request.

The method may further include suggesting point conversion when a payment amount corresponding to the payment request is less than or equal to a total balance of a point corresponding to the user transmitted from at least one of the one or more affiliates.

The transmitting of the point inquiry request to the server of the one or more affiliates may include identifying information on the one or more affiliates and transmitting the point inquiry request including information corresponding to each of the one or more affiliates to each server of the one or more affiliates.

When the first point corresponds to a point to be converted to cash and withdrawn, the method may further include, instead of processing a transaction corresponding to the conversion request, providing the user with information indicating that the conversion between the first point and the second point is unavailable in response to the conversion request.

The affiliate may correspond to a card company or a bank. The first point may correspond to a point accumulated to correspond to a card or a bank account managed by the affiliate.

The affiliate may correspond to an airline. The first point may correspond to an airline mileage point managed by the airline.

According to another aspect, there is also provided an electronic apparatus for processing information, the electronic apparatus including a transceiver, a memory in which instructions are stored, and a processor, wherein the processor is connected to the transceiver and the memory and configured to transmit a point inquiry request including user information for identifying a user to servers of one or more affiliates, acquire balance information of a first point corresponding to the user from a first affiliate among the one or more affiliates in response to the point inquiry request, provide the balance information of the first point to the user, and process, when information including a conversion request for conversion between the first point and a second point related to a service of the electronic apparatus is acquired from the user, a transaction corresponding to the conversion request.

Details of other example embodiments are included in the following detailed description and the accompanying drawings.

Effects

According to example embodiments, an electronic apparatus that processes information for point conversion and a method thereof may allow conversion between a point related to a service of the electronic apparatus and a point of an affiliate corresponding to a user so that the user can actively use various points.

Further, it is possible to induce the user to use the point to purchase an item sold on the electronic apparatus, which may lead to a promotion of item sales.

Effects of the present disclosure are not limited to those described above and other effects may be made apparent to those skilled in the art from the following description.

DETAILED DESCRIPTION

Figure 1:
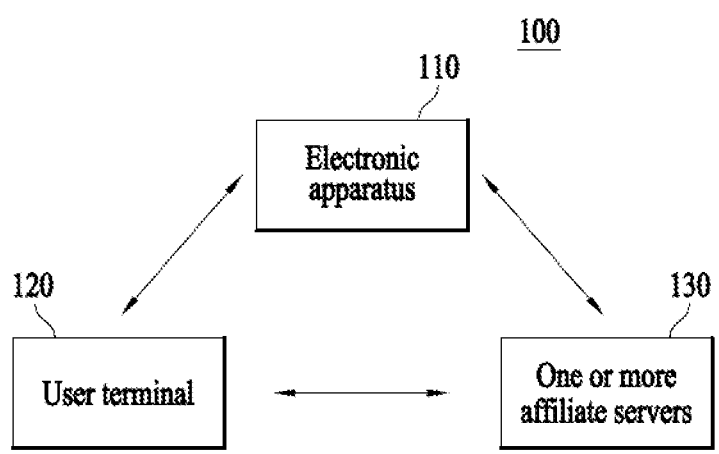
FIG. 1 is a diagram illustrating a system for processing information for point conversion according to an example embodiment.

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

In describing the example embodiments, descriptions of technical contents that are well known in the art to which the present disclosure belongs and are not directly related to the present specification will be omitted. This is to more clearly communicate without obscure the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following example embodiments that will be described in more detail with reference to the accompanying drawings. It should be noted, however, that the present disclosure is not limited to the following example embodiments, and may be implemented in various forms. Accordingly, the example embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed substantially concurrently, or the blocks may sometimes be executed in the reverse order, depending on the corresponding function.

FIG. 1 is a diagram illustrating a system for processing information for point conversion according to an example embodiment.

According to example embodiments, a system 100 for processing information for point conversion may include an electronic apparatus 110, a user terminal 120, and servers of one or more affiliates, hereinafter, referred to as "one or more affiliate servers" 130. In some example embodiments, the system 100 may further include a network that supports data transmission and reception performed between at least some of the electronic apparatus 110, the user terminal 120, and the one or more affiliate servers 130. Meanwhile, in the example embodiment, some of the one or more affiliate servers 130 may be servers that integrally manage a plurality of companies (for example, same affiliates) and may also be a system in which servers are connected through a network.

Each of the electronic apparatus 110, the user terminal 120, and the one or more affiliate servers 130 may include a transceiver, a memory, and a processor. In addition, each of the electronic apparatus 110, the user terminal 120, and the one or more affiliate servers 130 may be a unit that processes at least one function or operation, which may be implemented by hardware or software, or a combination of hardware and software. Meanwhile, in the overall example embodiments, the electronic apparatus 110, the user terminal 120, and the one or more affiliate servers 130 are referred to as separate devices or servers, but they may be logically divided structures and implemented as separate functions in a single server. For example, depending on embodiments, the one or more affiliate servers 130 may correspond to a single server and may also correspond to a plurality of servers. The one or more affiliate servers 130 will be further described later in greater detail.

According to an example embodiment, the electronic apparatus 110, the user terminal 120, and the one or more affiliate servers 130 may include a plurality of computer systems implemented as network servers or computer software. For example, at least some of the electronic apparatus 110, the user terminal 120, and the one or more affiliate servers 130 may refer to a computer system and computer software connected to a lower level device capable of communicating with another network server through a computer network such as an intranet or the Internet to receives a request to perform a task, performs the task, and provides a result of the task. In addition, at least some of the electronic apparatus 110, the user terminal 120, and the one or more affiliate servers 130 may be understood as broad concepts including a series of application programs that can operate on a network server and various databases built therein. At least some of the electronic apparatus 110, the user terminal 120, and the one or more affiliate servers 130 may be implemented using a network server program that is provided in various ways based on an operating system such as DOS, Windows, Linux, UNIX, or MacOS, for example.

The electronic apparatus 110 may be a device that provides a service related to a second point. Specifically, the electronic apparatus 110 may be a device that manages a website to provide a service for e-commerce transactions online. In relation to this, the second point may be accumulated using the service provided by the electronic apparatus 110, or the second point may be used to purchase an item corresponding to the service provided by the electronic apparatus 110.

Hereinafter, for ease and convenience, a description will be given of an example embodiment in which the electronic apparatus 110 is a device that manages a website to provide a service for e-commerce transactions online. However, this is merely an example, and the electronic apparatus 110 may be a device that provides various services related to the second point. Also, the service provided by the electronic apparatus 110 is not limited to the service for e-commerce transactions.

The electronic apparatus 110 may configure various information into a webpage on a website and provide the webpage to the user terminal 120. Specifically, the electronic apparatus 110 may be a device for providing various information related to item sales to the user terminal 120.

The electronic apparatus 110 transmits a point inquiry request including user information for identifying a user to the one or more affiliate servers 130. The user information may include information for distinguishing between a user designated in the electronic apparatus 110 and the one or more affiliate servers 130 and other users. Specifically, the user information may include at least one of connecting information (CI) used by one or more affiliates to identify the user and inquiry identification information generated in the electronic apparatus 110 in response to the point inquiry request. In some cases, the user information may further include at least one of time information and a flag value.

The inquiry identification information generated in the electronic apparatus 110 will be described in greater detail with reference to FIG. 8.

The electronic apparatus 110 acquires balance information of a first point corresponding to the user and provides the acquired balance information of the first point to the user. Specifically, the electronic apparatus 110 provides the balance information of the first point to the user terminal 120, so that the balance information of the first point is displayed on the user terminal 120.

An example of displaying the balance information of the first point will be described with reference to FIG. 5.

When information including a conversion request for conversion between the first point and the second point related to a service of the electronic apparatus 110 is acquired from the user, the electronic apparatus 110 processes a transaction corresponding to the conversion request. Information including the conversion request may be acquired through the user terminal 120.

A description related to processing the transaction will be given with reference to FIG. 3.

The user terminal 120 may be a device used by the user to purchase an item on an e-commerce website. The user terminal 120 may be implemented as a computer or portable terminal capable of transmitting and receiving various information to and from the electronic apparatus 110 through a network. The user terminal 120 may provide the information received from the electronic apparatus 110 to the user, receive an input from the user, and transmit the input to the electronic apparatus 110. Specifically, the user terminal 120 may receive the balance information of the first point, provide the balance information to the user, receive an input corresponding to information including the conversion request for the conversion between the first point and the second point from the user, and transmit the information including the conversion request to the electronic apparatus 110. Also, in some cases, the user terminal 120 may receive information related the user and transmit the information to the electronic apparatus 110, or may receive, from the electronic apparatus 110, balance information of the first point and balance information of the second point obtained after the transaction is performed in the electronic apparatus 110 and provide the balance information to the user. A description of such will be given in greater detail with reference to FIG. 2.

The electronic apparatus 110 may provide the user terminal 120 with a payment page for purchase and payment for one or more items, so that the user terminal 120 provides a payment page to the user on a screen or the like. In addition, the user terminal 120 may perform an operation related to data transmission and reception between the user and the electronic apparatus 110. An input that is received from a user may include various types of inputs such as a click through a mouse, a touch through a touch pad or a touch screen, voice recognition, and other electronic inputs.

The one or more affiliate servers 130 may be servers of one or more affiliates, which are devices for providing services of respective affiliates. One or more affiliates may correspond to companies having alliances with the electronic apparatus 110 to provide services in connection with the service provided by the electronic apparatus 110. According to an example embodiment, at least some of the one or more affiliates may correspond to a card company or a bank, and a point corresponding to the affiliate may correspond to a point accumulated in association with a card or bank account managed by the affiliate. According to an example embodiment, at least some of the one or more affiliates may correspond to an airline, and a point corresponding to the affiliate may correspond to an airline mileage point managed by the airline.

According to an example embodiment, the electronic apparatus 110 may acquire information on an affiliate related to the user from the user terminal 120. In this case, the one or more affiliates corresponding to the one or more affiliate servers 130 may be determined based on information on the affiliate related to the user. For example, one or more affiliates corresponding to the one or more affiliate servers 130 may include AA card company, BB card company, and CC card company input from the user in advance.

When the one or more affiliate servers 130 is determined based on the information on the affiliate acquired from the user terminal 120, a point inquiry request may not be transmitted to an affiliate where the user is not registered. Thus, resources for data communication may be saved, and overhead may be prevented.

The one or more affiliate servers 130 may receive the point inquiry request transmitted from the electronic apparatus 110 and transmit point balance information corresponding to the user to the electronic apparatus 110 in response to the point inquiry request. In this case, the point balance information transmitted from the one or more affiliate servers 130 may correspond to balance information of a point managed by each affiliate.

According to an example embodiment, the point managed for each affiliate may include at least one of a card point corresponding to a use of a credit card and an airline mileage corresponding to a use of an airline service.

The network may serve to connect the electronic apparatus 110 to the user terminal 120, the one or more affiliate servers 130, or other external devices. For example, the network may provide a connection path so that the user terminal 120 is connected with the electronic apparatus 110 and may transmit/receive packet data to/from the electronic apparatus 110.

A series of operations related to a method for processing information for point conversion according to various example embodiments may be implemented by a single physical device, or may be implemented by a plurality of physical devices combined organically. For example, some of the components included in the system 100 may be implemented by one physical device, and the remaining components may be implemented as another physical device. For example, one physical device may be implemented as a part of the electronic apparatus 110, and another physical device may be implemented as a part of the user terminal 120, a part of the one or more affiliate servers 130, or a part of an external device. In some cases, components included in the system 100 may be distributed and arranged in different physical devices. The distributed components may be organically combined to perform functions and operations of the system 100. For example, the electronic apparatus 110 of the present disclosure may include at least one sub-device. Some operations described as being performed by the electronic apparatus 110 may be performed by a first sub-device, and some other operations may be performed by a second sub-device.

Figure 2:
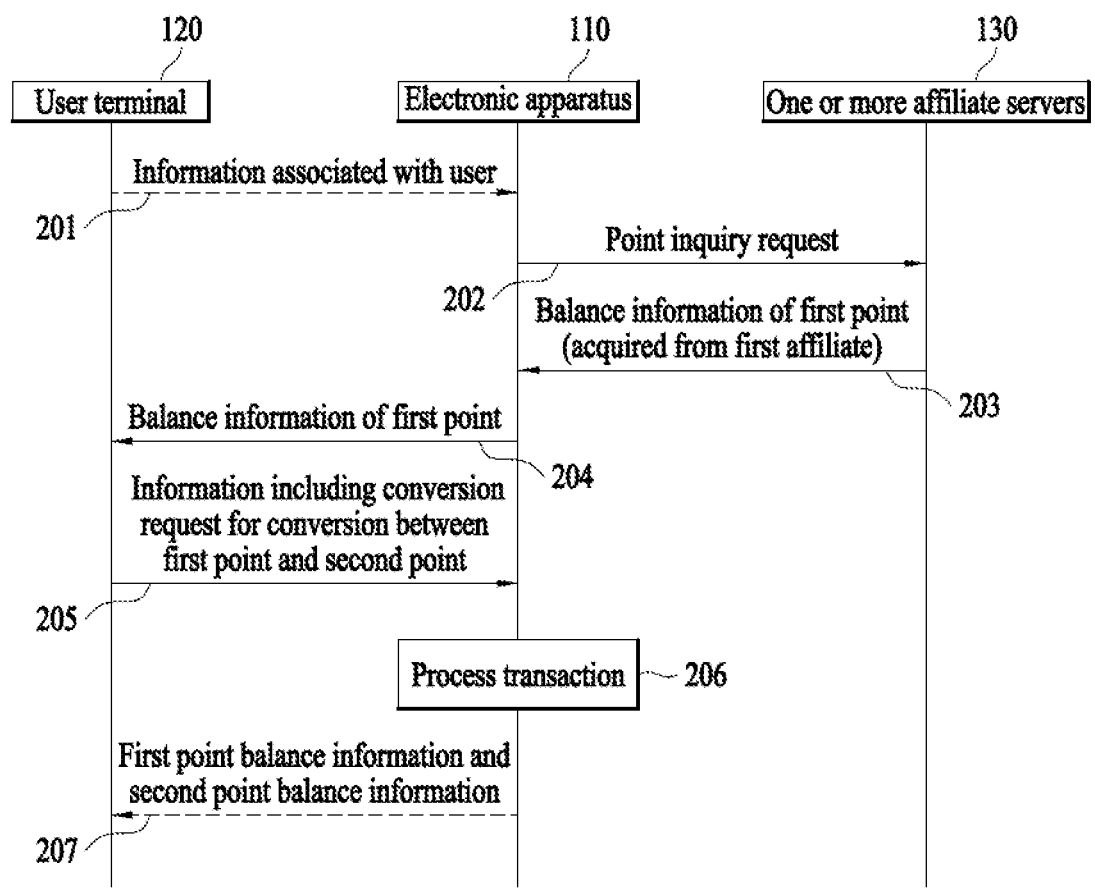
FIG. 2 is an operation flowchart illustrating an information processing method of an electronic apparatus in a system for processing information for point conversion according to an example embodiment.

FIG. 2 is an operation flowchart illustrating an information processing method of an electronic apparatus in a system for processing information for point conversion according to an example embodiment.

Referring to FIG. 2, in operation 202, the electronic apparatus 110 according to an example embodiment transmits a point inquiry request including user information for identifying a user to the one or more affiliate servers 130. According to the example embodiment, the electronic apparatus 110 may previously receive information related to the user from the user terminal 120 in operation 201 and acquire the user information included in the point inquiry request based on the received information.

According to an example embodiment, the electronic apparatus 110 may acquire advance approval information related to point inquiry corresponding to a first affiliate. In this case, the electronic apparatus 110 may omit transmission of the point inquiry request and acquire balance information of a first point based on the advance approval information. In relation to this, to omit a separate point inquiry request, the electronic apparatus 110 may announce the acquire advance approval information to the first affiliate. Alternatively, when the advance approval information is acquired from the first affiliate, it may be unnecessary to announce the advance approval information to the first affiliate.

According to an example embodiment, the electronic apparatus 110 may identify information of one or more affiliates and transmit a point inquiry request including information corresponding to each of the one or more affiliates to each server of the one or more affiliates. In this case, the point inquiry request transmitted from the electronic apparatus 110 may include different information for each affiliate receiving the point inquiry request.

The electronic apparatus 110 acquires point balance information transmitted from at least one of the one or more affiliate servers 130. For ease and convenience, the following description is based on an example in which the electronic apparatus 110 acquires balance information of a first point from a server corresponding to a first affiliate among the one or more affiliate servers 130 as indicated by reference numeral 203. However, the description of such does not limit contents of the present disclosure to the example in which the electronic apparatus 110 acquires point balance information from only one server among the one or more affiliate servers 130. Instead, it should be understood as briefly describing operations of the electronic apparatus 110 and affiliate's servers in view of a specific server among at least one server acquiring point balance information.

In operation 204, the electronic apparatus 110 acquiring the balance information of the first point provides the balance information of the first point to the user terminal 120. When information including a conversion request for conversion between the first point and a second point is received from the user terminal 120 in operation 205, the electronic apparatus 110 processes a transaction corresponding to the conversion request in operation 206.

According to an example embodiment, the electronic apparatus 110 may further acquire information including a conversion ratio between the first point and the second point. As an example, the electronic apparatus 110 may fetch a conversion ratio between the first point and the second point stored in advance, thereby acquiring information including the conversion ratio between the first point and the second point. As another example, the electronic apparatus 110 may acquire information including a conversion ratio between the first point and the second point from a first affiliate's server or other external devices. As another example, the electronic apparatus 110 may acquire information including a conversion ratio between the first point and the second point based on value information of the first point and value information of the second point, which are stored in advance.

When the electronic apparatus 110 acquires the information including the conversion ratio between the first point and the second point, a transaction corresponding to reference numeral 206 may be performed based on the acquired conversion ratio between the first point and the second point.

According to an example embodiment, the electronic apparatus 110 may acquire advance approval information related to point conversion corresponding to the first affiliate. In this case, the electronic apparatus 110 may omit an acquisition of the information including the conversion request and convert the first point to the second point based on the advance approval information. In relation to this, to omit the acquisition of a separate point conversion request, the electronic apparatus 110 may announce the acquired advance approval information to the first affiliate. Alternatively, when the advance approval information is acquired from the first affiliate, it may be unnecessary to announce the advance approval information to the first affiliate.

According to an example embodiment, the electronic apparatus 110 may process the transaction corresponding to the conversion request only when the first point corresponds to a point that cannot be converted into cash and withdrawn. In this case, when the first point corresponds to a point that can be converted into cash and withdrawn, instead of processing the transaction corresponding to the conversion request, the electronic apparatus 110 may provide information indicating that the conversion between the first point and the second point is unavailable in response to the conversion request to the user.

A description related to processing the transaction will be made in greater detail with reference to FIG. 3.

In operation 207, the electronic apparatus 110 may transmit, to the user terminal 120, at least one of first point balance information and second point balance information obtained after the transaction is processed. The first point balance information and the second point balance information transmitted by the electronic apparatus 110 may correspond to balance information obtained after the point conversion corresponding to the conversion request is performed.

Figure 3:
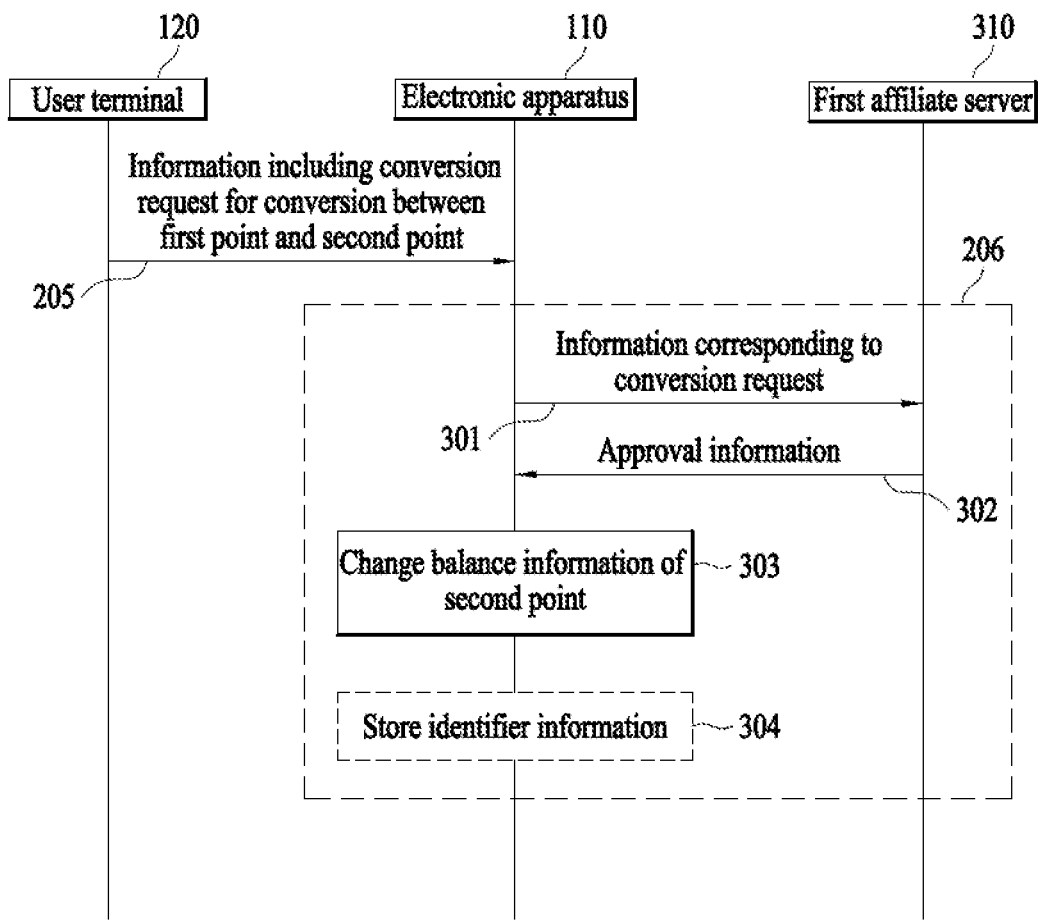
FIG. 3 is an exemplary diagram illustrating an operation of an electronic apparatus processing transaction corresponding to a conversion request according to an example embodiment.

FIG. 3 is an exemplary diagram illustrating an operation of an electronic apparatus processing transaction corresponding to a conversion request according to an example embodiment.

Referring to FIG. 3, when information including a conversion request for conversion between a first point and a second point is acquired from the user terminal 120 according to an example embodiment in operation 205, the electronic apparatus 110 processes a transaction corresponding to the conversion request in operation 206. Specifically, the electronic apparatus 110 may transmit information corresponding to the conversion request to a first affiliate server 310 in operation 301 and change balance information of a second point in operation 303. The information corresponding to the conversion request may include at least one of CI and inquiry identification information generated in the electronic apparatus 110 based on the transaction. In some example embodiments, the information corresponding to the conversion request may further include at least one of time information and a flag value.

The inquiry identification information generated in the electronic apparatus 110 will be described in greater detail with reference to FIG. 8.

According to an example embodiment, the electronic apparatus 110 may receive approval information from the first affiliate server 310 in response to the conversion request in operation 302 and change the balance information of the second point. In other words, when the approval information is received from the first affiliate server 310 in response to the conversion request, the electronic apparatus 110 may change the balance information of the second point. In this case, the balance information of the second point may be changed after whether the point conversion is completed without any problem is verified, which may prevent an occurrence of an accident related to the point conversion.

According to an example embodiment, after the information corresponding to the conversion request is transmitted to the first affiliate server 310, the electronic apparatus 110 may change the balance information irrespective of whether the approval information is received from the first affiliate server 310. In this case, since the balance information of the second point is changed without receiving the approval information from the first affiliate server 310, resources for data transmission and reception may be saved compared to an example of receiving the approval information, and thus the balance information of the second point may be more quickly changed.

In operation 304, the electronic apparatus 110 may record the processing of the transaction by storing the inquiry identification information generated in the electronic apparatus 110 based on the transaction. According to an example embodiment, the electronic apparatus 110 may store the inquiry identification information generated in the electronic apparatus 110 based on the transaction and may not store inquiry identification information generated to transmit a point inquiry request to the one or more affiliate servers 130.

Figure 4:
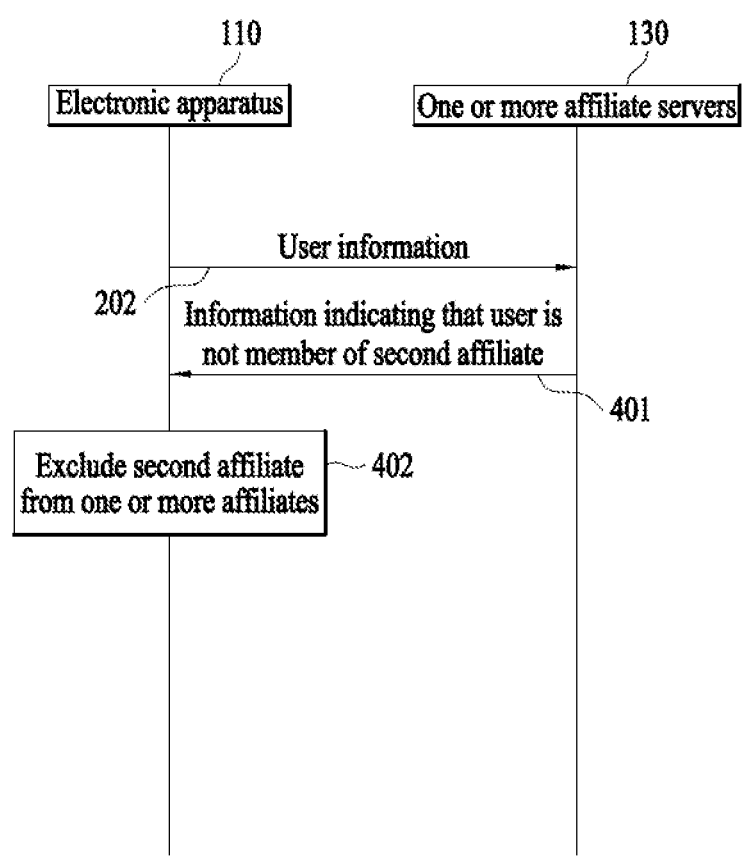
FIG. 4 is an exemplary diagram illustrating an operation of excluding a second affiliate from one or more affiliates by an electronic apparatus according to an example embodiment.

FIG. 4 is an exemplary diagram illustrating an operation of excluding a second affiliate from one or more affiliates by an electronic apparatus according to an example embodiment.

Referring to FIG. 4, the electronic apparatus 110 according to an example embodiment may transmit a point inquiry request including user information to the one or more affiliate servers 130 in operation 202. In response to the user information included in the point inquiry request transmitted from the electronic apparatus 110, a second affiliate included in the one or more affiliate servers 130 may transmit information indicating that a user is not a member of the second affiliate in operation 401.

When the information indicating that the user is not a member of the second affiliate is received, in operation 402, the electronic apparatus 110 may exclude the second affiliate from one or more affiliates. In this case, when transmitting a subsequent point inquiry request to the one or more affiliate servers 130, the electronic apparatus 110 may not transmit a point inquiry request to a server of the second affiliate.

Figure 5:
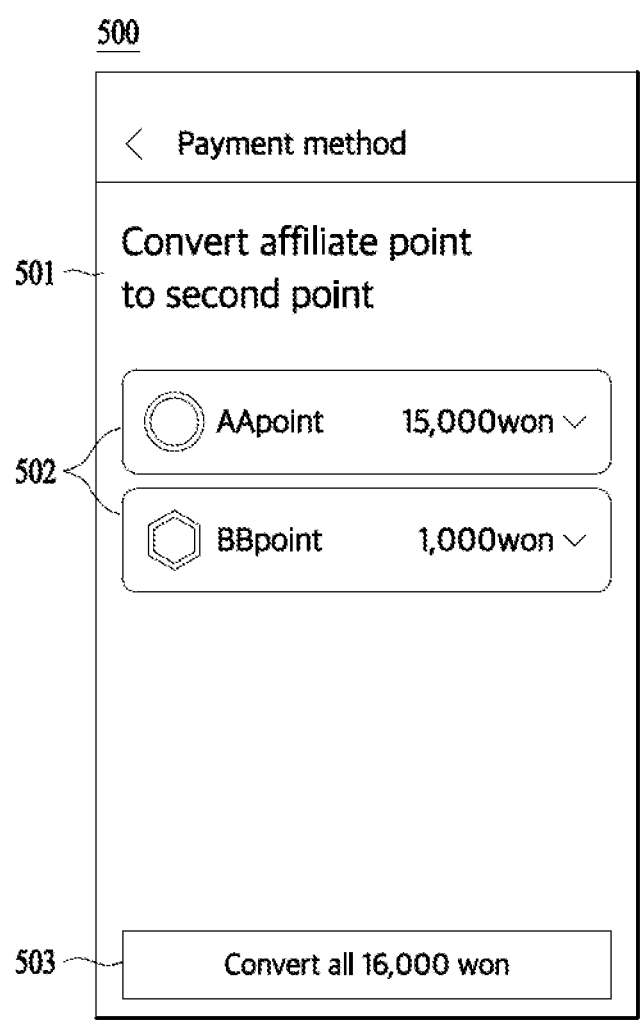
FIG. 5 is an exemplary diagram illustrating a screen for requesting point conversion according to an example embodiment.

FIG. 5 is an exemplary diagram illustrating a screen for requesting point conversion according to an example embodiment.

Referring to FIG. 5, the electronic apparatus 110 according to an example embodiment may acquire point balance information transmitted from at least one of the one or more affiliate servers 130 and provide the acquired point balance information to the user terminal 120. The electronic apparatus 110 may display the point balance information on the user terminal 120 so as to be viewed by a user.

A screen 500 for requesting point conversion may be displayed on the user terminal 120. The screen 500 displayed on the user terminal 120 may provide an interface and a text suggesting the point conversion along with the point balance information. For example, as indicated by reference numeral 501, the user terminal 120 may display a text "convert affiliate point to second point." Also, as indicated by reference numeral 503, the user terminal 120 may display an interface for receiving an input corresponding to a request for conversion between points.

According to an example embodiment, point balance information may be displayed to be distinguished for each affiliate. For example, when point balance information is acquired from AA card company and BB card company among affiliates, the point balance information may be displayed as "AA point: 15,000 won" and "BB point: 1,000 won" as indicated by reference numeral 502. In this case, for user's convenience, in addition to the text indicating AA point and BB point, images (e.g., images representing the points or images representing the card companies) corresponding to AA point and BB point may be displayed.

According to an example embodiment, the displayed point balance information may include an interface for receiving an input of the user. When an input of the user is applied to an interface corresponding to each point balance information, an additional interface for receiving an input of the user regarding a portion of the balance of the corresponding point to be converted to the second point may be displayed. Through the additional interface, the user may convert, to the second point, points of some of a plurality of affiliates from which point balance information is acquired. Also, the user may convert a portion of the points to the second point. For example, on the right side of the text such as "AA point: 15,000 won" and "BB point: 1,000 won", a dropdown button for receiving an input of the user regarding a portion of the balance of the corresponding point to be converted to the second point may be displayed. In this example, the user may input "10,000" to the additional interface along with an input to the dropdown button on the right side of "AA point: 15,000 won", thereby requesting a conversion of 10,000 won of AA point to the second point.

According to an example embodiment, the information and the interface displayed on the user terminal 120 may be simply displaying information and the like received from the electronic apparatus 110. According to an example embodiment, the information and the interface displayed on the user terminal 120 may be an interface and information generated in the user terminal 120 based on information and the like received from the electronic apparatus 110.

According to an example embodiment, even when the point balance information is displayed to be distinguished for each affiliate, a total point available for conversion may be further displayed. For example, the interface for receiving an input corresponding to a request for conversion between points may include a text such as "convert all 16,000 won" as indicated by the reference numeral 503.

However, this is merely providing an interface for receiving an input for converting all points at once for the user's convenience. As described above, the user may also request only a portion of AA point and BB point to be converted to the second point.

Figure 6:
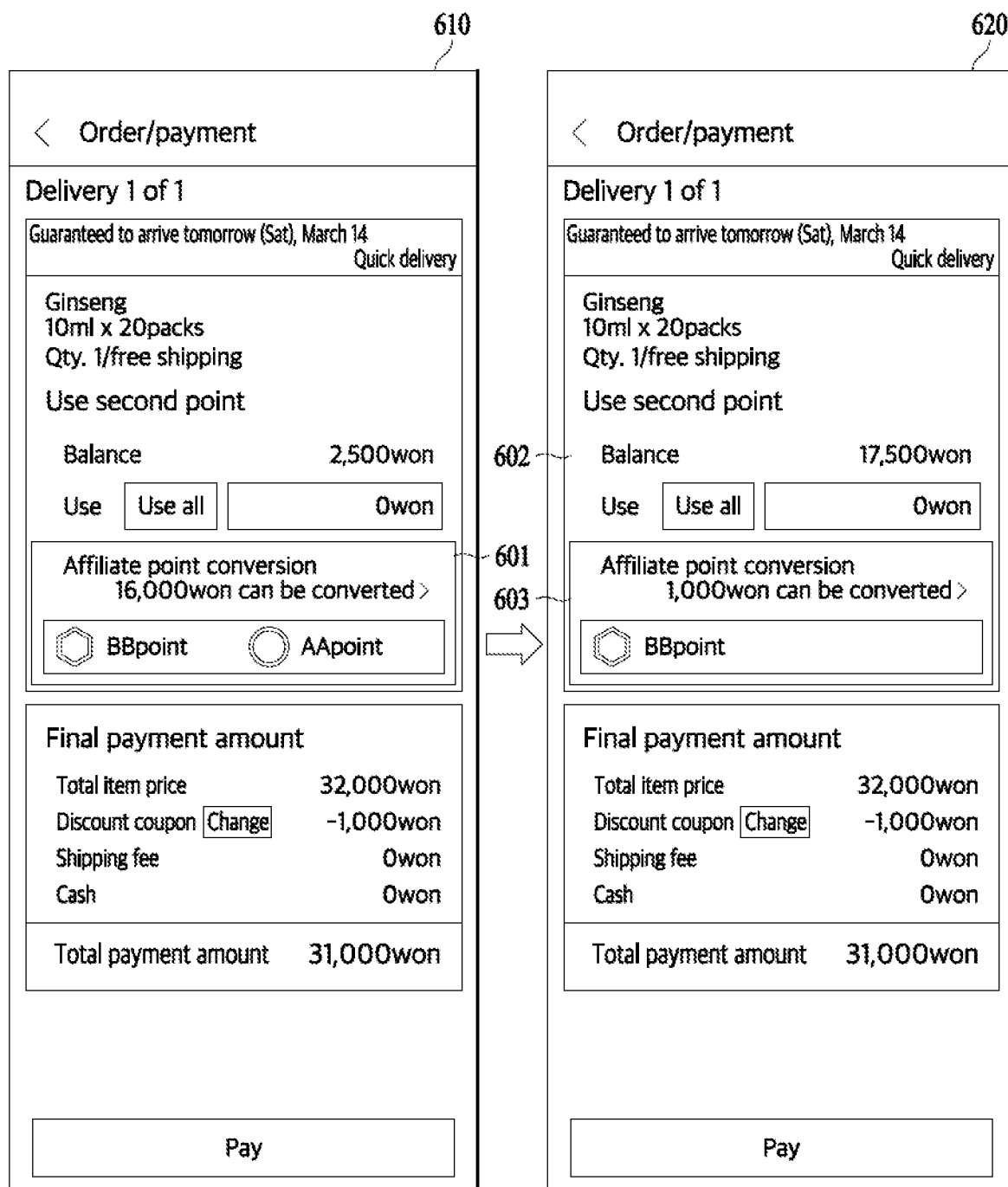
FIG. 6 is an exemplary diagram illustrating a payment screen displayed after point conversion is performed according to an example embodiment.

FIG. 6 is an exemplary diagram illustrating a payment screen displayed after point conversion is performed according to an example embodiment.

Referring to FIG. 6, as indicated by reference numeral 610, the electronic apparatus 110 according to an example embodiment may acquire a payment request for one or more items from a user and display a payment page on the user terminal 120 based on the payment request. According to an example embodiment, the electronic apparatus 110 may transmit a point inquiry request the one or more affiliate servers 130 in response to the payment request, acquire balance information of an affiliate point such as a first point, and provide the balance information to the user terminal 120.

The payment page displayed on the user terminal 120 may include an interface for paying at least a portion of a payment amount based on a second point. The interface for paying at least a portion of the payment amount based on the second point may show a text corresponding to a balance of the second point, such as "2,500 won remains."

In addition, the payment page displayed on the user terminal 120 may include an interface for requesting point conversion as indicated by reference numeral 601. According to an example embodiment, the interface for requesting the point conversion may include at least one of a text related to the point conversion, balance information of a point available for conversion, a type of the point available for conversion, and an interface for displaying the screen 500 for requesting the point conversion. For example, the interface for requesting the point conversion may include a text such as "convert affiliate point" and "16,000 won can be converted" and display a type of a point available for conversion as "BB point" and "AA point." Also, the interface for requesting the point conversion may show a button on the right side of the text "16,000 won can be converted." When an input is applied by a user to the corresponding button, the interface for requesting the point conversion may show the screen 500 for requesting the point conversion.

In some example embodiments, the interface for requesting the point conversion may allow a point conversion request to be made directly on the payment page without showing the screen 500 for requesting the point conversion. For example, the interface for requesting the point conversion may further display a button like "convert all 16,000 won" and convert AA point and BB point into the second points in response to an input of the user.

As indicated by reference numeral 620, the electronic apparatus 110 acquiring the information including the point conversion request from the user and processing the transaction corresponding to the conversion request may display, on the user terminal 120, a payment page reflecting balance information of an affiliate point (e.g., the first point) and balance information of the second point changed after the transaction is processed. For example, the balance of the second point may be 2,500 won before the conversion, a conversion request for conversion of 15,000 won of AA point to the second point may be made by the user, and a transaction corresponding to the conversion request may be successfully processed. In this example, the interface for paying at least a portion of the payment amount based on the second point may display changed balance information such as "17,500 remains" in connection with the second point as indicated by reference numeral 602. In addition, the interface for requesting the point conversion may display changed balance information of the affiliate point such as "1,000 won can be converted" as indicated by reference numeral 603.

According to an example embodiment, when a payment amount corresponding to the payment request from the user is less than or equal to a total balance of a point corresponding to a user transmitted from at least one of the one or more affiliates, the electronic apparatus 110 may suggest the point conversion to the user. For example, the electronic apparatus 110 may further display a text such as "total payment amount can be paid by points" through the interface for requesting the point conversion.

Figure 7:
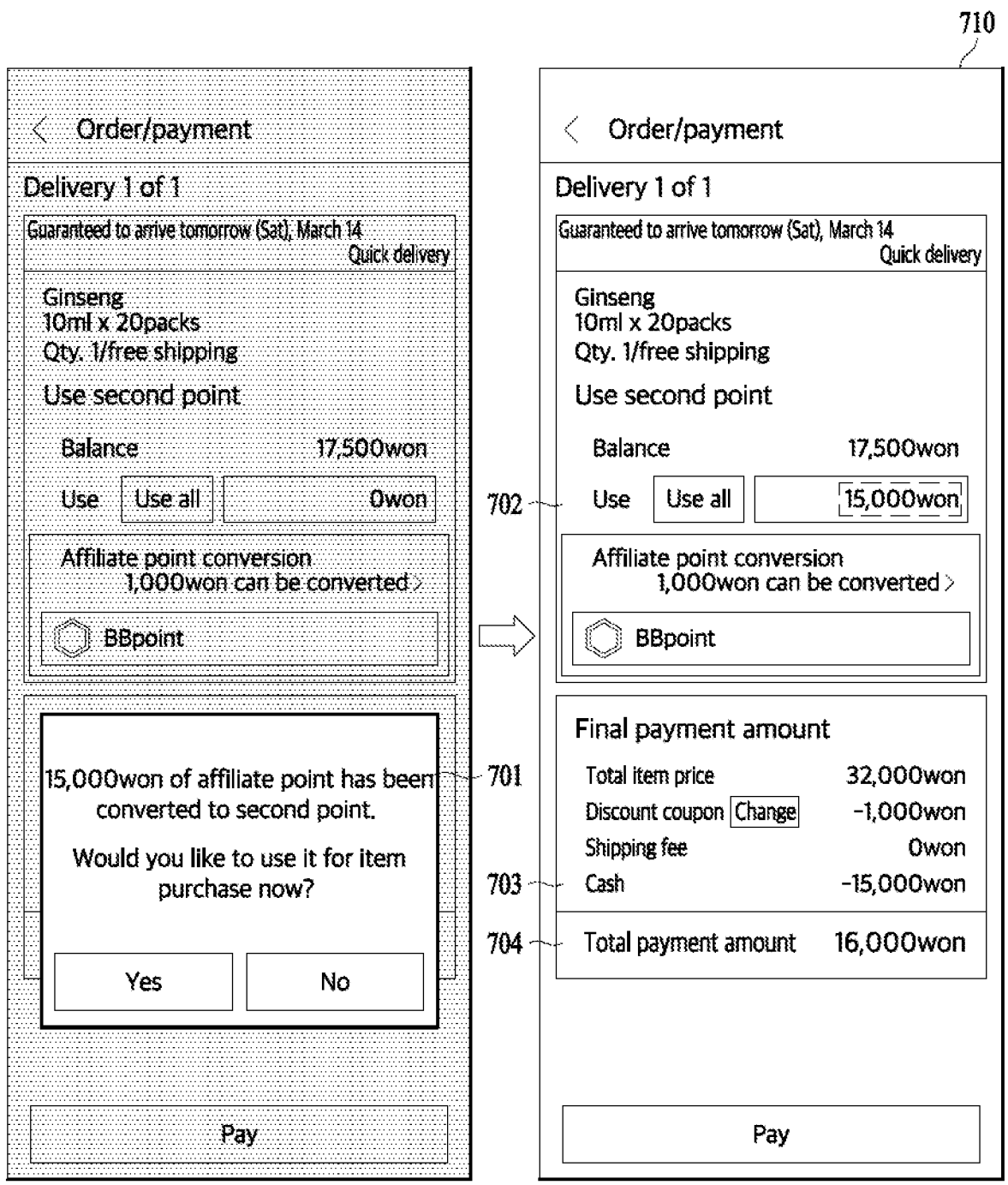
FIG. 7 is an exemplary diagram illustrating a screen suggesting a payment to be performed using a second point after point conversion is performed according to an example embodiment.

FIG. 7 is an exemplary diagram illustrating a screen suggesting a payment to be performed using a second point after point conversion is performed according to an example embodiment.

Referring to FIG. 7, when a transaction corresponding to a conversion request for conversion between an affiliate point such as a first point according to an example embodiment and a second point is successfully processed, the electronic apparatus 110 may suggest a payment using the second point by displaying, on the user terminal 120, an interface for paying one or more items based on balance information of the second point corresponding to the conversion request so as to be viewed by a user.

According to an example embodiment, the interface for paying one or more items based on balance information of the second point may include at least one of a text inquiring whether to use the second point for an item purchase and a text related to an amount of an affiliate point such as the first point having been converted to the second point. For example, the interface for paying one or more items based on balance information of the second point may include a text like "15,000 won of affiliate point has been converted to the second point. Would you like to use it for item purchase now?" as indicated by reference numeral 701. In addition, the interface for paying one or more items based on balance information of the second point may further include an interface for receiving an input of a user regarding whether to use the second point for an item payment and may include, for example, a button "yes" and a button "no" as indicated by the reference numeral 701.

According to an example embodiment, the interface for paying one or more items based on balance information of the second point may be provided in a form of a popup window.

When a user input agreeing to the item payment based on the converted second point is received, a payment page reflecting contents on the payment for an item amount using the converted second point may be displayed as indicated by reference numeral 710. Specifically, the electronic apparatus 110 may reflect the contents on the payment for the item amount using the converted second point, to an interface for paying by the second point and information associated with a final payment amount. For example, the electronic apparatus 110 may display a text such as "use 15,000 won" through the interface for paying by the second point as indicated by reference numeral 702. Also, the electronic apparatus 110 may display a text 703 "cash: −15,000 won" in a field of the final payment amount and display a text 704 "total payment amount: 16,000 won" which is a payment amount to which the used second point has been applied.

Figure 8:
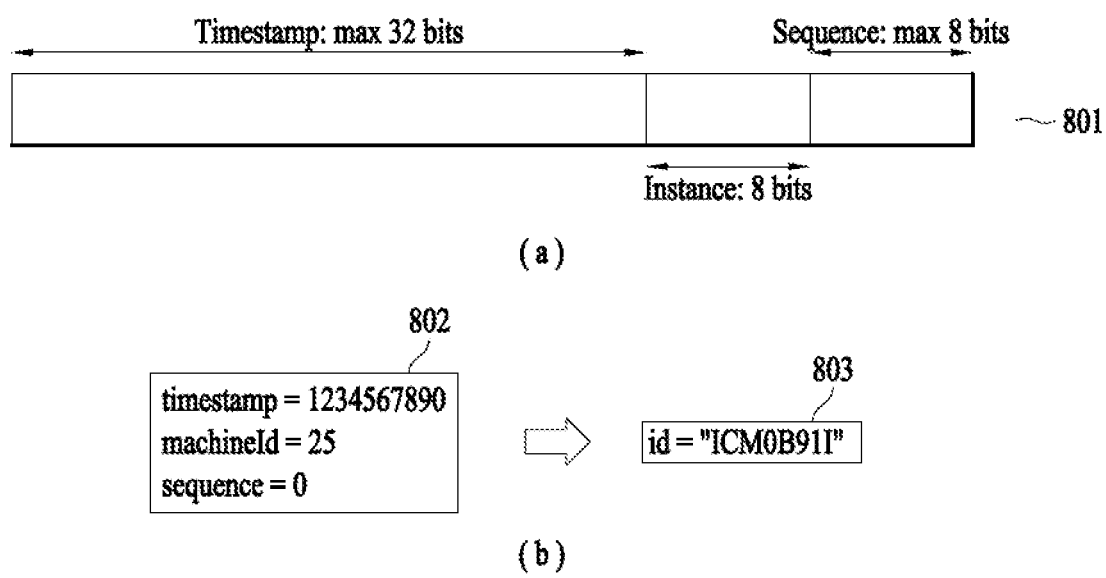
FIG. 8 is an exemplary diagram illustrating an example of inquiry identification information included in user information according to an example embodiment.

FIG. 8 is an exemplary diagram illustrating an example of inquiry identification information included in user information according to an example embodiment.

Referring to FIG. 8, user information according to an example embodiment may include inquiry identification information generated in the electronic apparatus 110. The inquiry identification information may be represented by a character string within a predetermined number of digits. By representing the inquiry identification information as the character string within the predetermined number of digits, the inquiry identification information can be compatible even for an affiliate for which inquiry identification information with a relatively long character string is not compatible. In addition, resources related to data transmission and reception can be saved.

According to an example embodiment, the inquiry identification information may be generated based on at least one of a time point corresponding to an acquisition of the inquiry identification information, a serial number corresponding to a server device acquiring the inquiry identification information, and a sequence number corresponding to an ordinal position at which the inquiry identification information is acquired among a plurality of pieces of inquiry identification information acquired in the electronic apparatus based on the time point. In relation to this, the server device may be a server device of the electronic apparatus 110 or other external devices related to the generation of the inquiry identification information.

According to an example embodiment, the electronic apparatus 110 may generate fourth information based on at least one of first information (e.g., "Timestamp" of the drawing) corresponding to the time point corresponding to an acquisition of the inquiry identification information, second information (e.g., "Instance" of the drawing) corresponding to the serial number corresponding to the server device acquiring the inquiry identification information, and third information corresponding to the sequence number (e.g., "Sequence" of the drawing) corresponding to an ordinal position at which the inquiry identification information is acquired among a plurality of pieces of inquiry identification information acquired in the electronic apparatus based on the time point. Also, the electronic apparatus 110 may generate the inquiry identification information by converting the fourth information. Referring to (a) of FIG. 8, the first information according to an example embodiment may be information in which the time point corresponding to an acquisition of the inquiry identification information is expressed in a binary number of 32 bits or less. The second information may be information in which the serial number corresponding to the server device is expressed by a binary number of 8 bits. The third information may be information in which the sequence number is expressed by a binary number of 8 bits or less. By sequentially connecting the information, the electronic apparatus 110 may generate the fourth information as indicated by reference numeral 801. For example, the fourth information may be information expressed by a binary number of 48 bits or less.

Thereafter, the electronic apparatus 110 may generate the inquiry identification information by converting first data. Specifically, the electronic apparatus 110 may generate the inquiry identification information by converting the first data expressed by a binary number into a base-32 number representing the numbers 10 to 31 in uppercase alphabetic characters. In this case, since the uppercase alphabetic characters include 26 characters, the numbers 10 to 31 may be shown to be distinguished from one another. Also, the fourth information may be the binary number of 48 bits or less. Thus, the converted inquiry identification information may be less than 10 digits (since $32=2^5$ and $48/5=9.6$). As a result, the converted inquiry identification information may correspond to a character string including a combination of numbers less than 10 digits and the uppercase alphabetic characters.

(b) of FIG. 8 shows an example of a time point corresponding to an acquisition of inquiry identification information, a serial number corresponding to a server device acquiring the inquiry identification information, and a sequence number corresponding to an ordinal position at which the inquiry identification information is acquired among a plurality of pieces of inquiry identification information acquired in the electronic apparatus based on the time point, and an example of inquiry identification information generated. Specifically, as indicated by reference numeral 802, time point information corresponding to an acquisition of the inquiry identification information may be 1234567890, the serial number corresponding to the server device may be 25, and the sequence number may be 0. Also, the generated inquiry identification information may be ICM0B91I as indicated by reference numeral 803.

According to an example embodiment, a process of generating the inquiry identification information of the reference numeral 803 based on the information of the reference numeral 802 may be as follows. Since the time point information corresponding to the acquisition of the inquiry identification information is 1234567890, "1001001100101110000001011010010" that is the first information may be obtained by converting the time point information into the binary number. Since the serial number corresponding to the server device is 25, the second information "00011001" may be obtained by converting the serial number into the binary number. Since the sequence number is 0, the third information "0" may be obtained by converting the sequence number into the binary number. "100100110010110000000101101001000110010" obtained by sequentially connecting the first information, the second information, and the third information may be converted into the base-32 number, thereby generating the fourth information "ICM0B91I."

Figure 9:
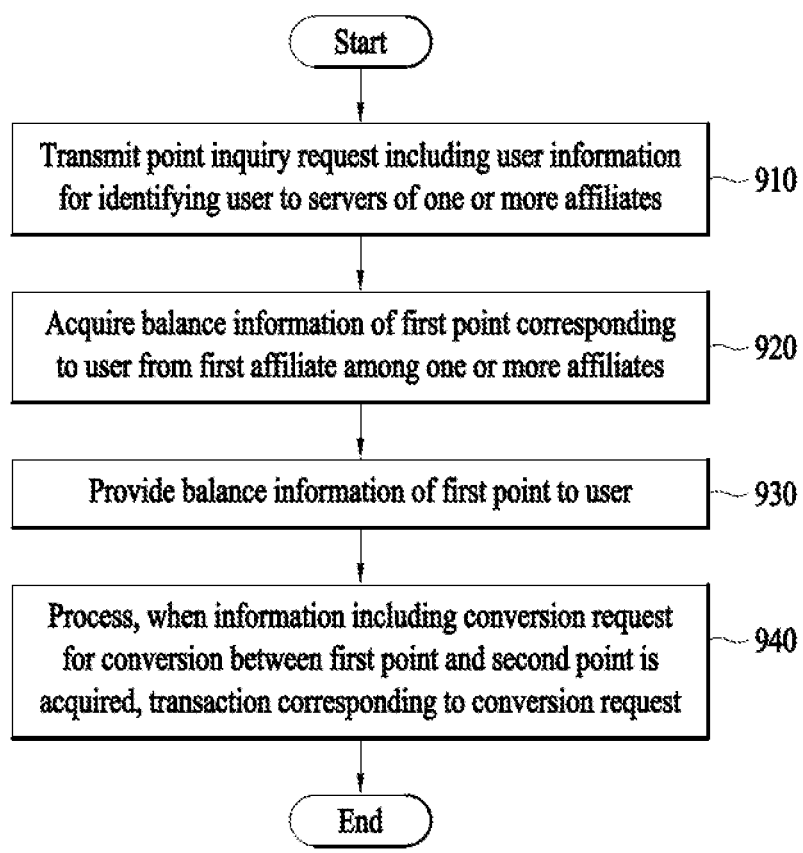
FIG. 9 is a flowchart illustrating an information processing method of an electronic apparatus according to an example embodiment.

FIG. 9 is a flowchart illustrating a method of processing information in an electronic apparatus according to an example embodiment.

Referring to FIG. 9, in operation 910, the electronic apparatus 110 according to an example embodiment transmits a point inquiry request including user information for identifying a user to servers of one or more affiliates. In operation 920, the electronic apparatus 110 acquires balance information of a first point corresponding to the user from a first affiliate among the one or more affiliates in response to the point inquiry request.

In operation 930, the electronic apparatus 110 provides the acquired balance information of the first point to the user. When information including a conversion request for conversion between the first point and a second point related to a service of the electronic apparatus is acquired from the user, in operation 940, the electronic apparatus 110 processes a transaction corresponding to the conversion request.

Figure 10:
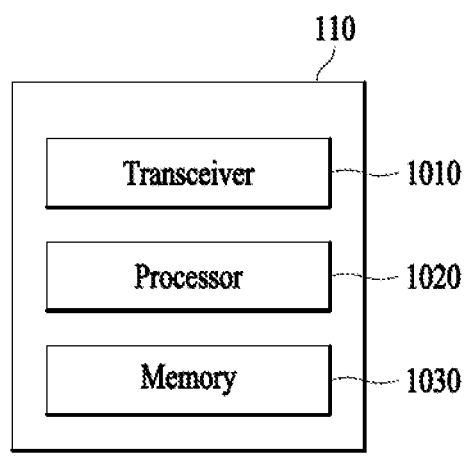
FIG. 10 is an exemplary diagram illustrating a configuration of an electronic apparatus that processes information for point conversion according to an example embodiment.

FIG. 10 is a diagram illustrating an example of an electronic apparatus for processing item sales information according to an example embodiment.

Referring to FIG. 10, the electronic apparatus 110 includes a transceiver 1010, a processor 1020, and a memory 1030. The electronic apparatus 110 is connected to the user terminal 120, the server 130 of one or more affiliates, and other external devices through the transceiver 1010, and may perform data exchange.

The processor 1020 may include at least one of the devices described above with reference to FIGS. 1 through 9, or may perform at least one method described above with reference to FIGS. 1 through 9. The memory 1030 may store information for performing at least one method described above with reference to FIGS. 1 through 9. The memory 1030 may be a volatile memory or a nonvolatile memory.

The processor 1020 may execute a program and control the electronic apparatus 110 for providing information. The code of a program executed by the processor 1020 may be stored in the memory 1030.

Also, in an example embodiment, the electronic apparatus 110 may provide, to the user terminal 120, a UI for providing information to a user.

The present specification and drawings have been described with respect to the example embodiments of the present disclosure. Although specific terms are used, it is only used in a general sense to easily explain the technical content of the present disclosure and to help the understanding of the invention, and is not intended to limit the scope of the specification. It will be apparent to those skilled in the art that other modifications based on the technical spirit of the present disclosure may be implemented in addition to the embodiments disclosed herein.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method operable by an electronic apparatus to process point conversion requests, the method comprising:
 receiving, by a transceiver of the electronic apparatus, a point inquiry request from a user device;
 in response to the receiving of the point inquiry request, determining, by a processor of the electronic apparatus, timestamp information associated with generating inquiry identification information, server information associated with a server in charge of generating the inquiry identification information, and sequence information associated with an ordinal position at which the inquiry identification information is generated with respect to a plurality of other inquiry identification information generated by the electronic apparatus;
 generating, by the processor, the inquiry identification information based on the timestamp information, the server information, and the sequence information, wherein the inquiry identification information is generated by converting a series of numerical bits into alphanumeric characters, wherein the series of numerical bits comprises 48 bits or less and is generated by connecting numerical bits indicative of the timestamp information, the server information, and the sequence information in a predetermined order;
 transmitting, by the transceiver, the point inquiry request to servers of one or more affiliates, the point inquiry request comprising user information for identifying the user to the servers of one or more affiliates and the inquiry identification information;
 in response to the point inquiry request, receiving, by the processor, balance information of a first point corresponding to the user from a first affiliate among the one or more affiliates;
 transmitting, by the transceiver, the balance information of the first point to the user device;

receiving, by the processor, a conversion request for conversion between the first point and a second point from the user device; and in response to the receiving of the conversion request, processing, by the processor, a transaction corresponding to the conversion request.

2. The method of claim 1, wherein the user information includes at least one of connecting information (CI) for identifying the user in the one or more affiliates.

3. The method of claim 1, wherein the processing of the transaction corresponding to the conversion request comprises:

transmitting information corresponding to the conversion request to the first affiliate; and changing balance information of the second point, wherein the information corresponding to the conversion request comprises at least one of CI or inquiry identification information generated in the electronic apparatus based on the transaction.

4. The method of claim 3, wherein the balance information of the second point is changed in response to receiving approval information from the first affiliate in response to the conversion request.

5. The method of claim 3, wherein the processing of the transaction corresponding to the conversion request further comprises:

recording processing of the transaction by storing the inquiry identification information.

6. The method of claim 1, further comprising:

receiving, from the user device, information on an affiliate related to the user, wherein the one or more affiliates are determined based on the information on the affiliate related to the user.

7. The method of claim 1, further comprising: in response to determining that the user has provided to the electronic apparatus advance approval information related to point conversion corresponding to the first affiliate, converting the first point is converted into the second point based on the advance approval information.

8. The method of claim 1, further comprising: in response to determining that the user has provided advance approval information related to a point inquiry corresponding to the first affiliate, receiving the balance information.

9. The method of claim 1, further comprising:

in response to the point inquiry request, receiving, from a second affiliate, information indicating that the user is not a member of the second affiliate;

excluding the second affiliate from the one or more affiliates.

10. The method of claim 1, further comprising:

acquiring information including a conversion ratio between the first point and the second point, wherein the transaction is performed based on the information including the conversion ratio.

11. The method of claim 1, further comprising:

providing, to the user, at least one of the balance information of the first point or balance information of the second point corresponding to the conversion request.

12. The method of claim 1, further comprising:

acquiring a payment request for one or more items from the user, wherein the point inquiry request is transmitted based on the payment request.

13. The method of claim 12, further comprising:

providing, to the user, an interface for paying the one or more items based on balance information of the second point corresponding to the conversion request.

14. The method of claim 12, further comprising:

suggesting point conversion when a payment amount corresponding to the payment request is less than or equal to a total balance of a point corresponding to the user transmitted from at least one of the one or more affiliates.

15. The method of claim 1, wherein the transmitting of the point inquiry request to the servers of the one or more affiliates comprises:

identifying information on the one or more affiliates; and transmitting the point inquiry request including information corresponding to each of the one or more affiliates to each of the servers of the one or more affiliates.

16. The method of claim 1, further comprising:

when the first point corresponds to a point to be converted to cash and withdrawn, instead of processing a transaction corresponding to the conversion request, providing the user with information indicating that the conversion between the first point and the second point is unavailable in response to the conversion request.

17. The method of claim 1, wherein the server information comprises a serial number associated with the server of one or more affiliates receiving the inquiry identification information.

18. The method of claim 1, wherein the second point is related to a service provided by an entity associated with the electronic apparatus.

19. A non-transitory computer-readable recording medium storing thereon computer-readable instructions that, when executed by a processor of an electronic apparatus, cause the processor to:

receive, via a transceiver, a point inquiry request from a user device;

in response to the receiving of the point inquiry request, determine timestamp information associated with generating inquiry identification information, server information associated with a server in charge of generating the inquiry identification information, and sequence information associated with an ordinal position at which the inquiry identification information is generated with respect to a plurality of other inquiry identification information generated by the electronic apparatus;

generate the inquiry identification information based on the timestamp information, the server information, and the sequence information, wherein the inquiry identification information is generated by converting a series of numerical bits into alphanumeric characters, wherein the series of numerical bits comprises 48 bits or less and is generated by connecting numerical bits indicative of the timestamp information, the server information, and the sequence information in a predetermined order;

transmit, via the transceiver, the point inquiry request to servers of one or more affiliates, the point inquiry request comprising user information for identifying the user to the servers of one or more affiliates and the inquiry identification information;

in response to the point inquiry request, receive balance information of a first point corresponding to the user from a first affiliate among the one or more affiliates;

transmit the balance information of the first point to the user device;

receive a conversion request for conversion between the first point and a second point from the user device; and in response to the receipt of the conversion request, process a transaction corresponding to the conversion request.

20. An electronic apparatus for processing information, the electronic apparatus comprising:
a transceiver;
a memory in which instructions are stored; and
a processor,
wherein the processor is connected to the transceiver and the memory and configured to:
receive, via the transceiver, a point inquiry request from a user device;
in response to the receiving of the point inquiry request, determine timestamp information associated with generating inquiry identification information, server information associated with a server in charge of generating the inquiry identification information, and sequence information associated with an ordinal position at which the inquiry identification information is generated with respect to a plurality of other inquiry identification information generated by the electronic apparatus;
generate the inquiry identification information based on the timestamp information, the server information, and the sequence information, wherein the inquiry identification information is generated by converting a series of numerical bits into alphanumeric characters, wherein the series of numerical bits comprises 48 bits or less and is generated by connecting numerical bits indicative of the timestamp information, the server information, and the sequence information in a predetermined order;
transmit, via the transceiver, the point inquiry request to servers of one or more affiliates, the point inquiry request comprising user information for identifying the user to the servers of one or more affiliates and the inquiry identification information;
in response to the point inquiry request, receive balance information of a first point corresponding to the user from a first affiliate among the one or more affiliates;
transmit the balance information of the first point to the user device;
receive a conversion request for conversion between the first point and a second point from the user device; and
in response to the receipt of the conversion request, process a transaction corresponding to the conversion request.

* * * * *

UNITED STATES PATENT AND TRADEMARK OFFICE
CERTIFICATE OF CORRECTION

| | | |
|---|---|---|
| PATENT NO. | : 11,354,630 B1 | Page 1 of 1 |
| APPLICATION NO. | : 17/225692 | |
| DATED | : June 7, 2022 | |
| INVENTOR(S) | : Han et al. | |

It is certified that error appears in the above-identified patent and that said Letters Patent is hereby corrected as shown below:

In the Claims

At Column 19, Line 38 (Claim 7), after "first point" delete "is converted".

Signed and Sealed this
Twenty-seventh Day of December, 2022

Katherine Kelly Vidal
*Director of the United States Patent and Trademark Office*